United States Patent [19]

Quinn et al.

[11] Patent Number: 5,306,031
[45] Date of Patent: Apr. 26, 1994

[54] AUTOMATIC WEDGE CHASSIS ADJUSTER

[76] Inventors: Thomas N. Quinn; Kimberly J. Quinn, both of 504 Roaring Springs Cir., Hampton, Va. 23663

[21] Appl. No.: 44,576

[22] Filed: Apr. 6, 1993

[51] Int. Cl.⁵ .................................................. B60G 1/00
[52] U.S. Cl. ............................. 280/688; 280/707; 280/840; 180/41; 254/425; 254/DIG. 2
[58] Field of Search .............. 270/840, 707, 688, 772; 180/41; 254/425, DIG. 2

[56] References Cited

U.S. PATENT DOCUMENTS

| | | | |
|---|---|---|---|
| 1,794,675 | 3/1931 | Danner et al. | 254/425 |
| 2,583,250 | 1/1952 | Ball | 280/840 |
| 3,131,950 | 5/1964 | Weaver, Jr. et al. | 280/840 |
| 3,888,464 | 6/1975 | Folson | 254/425 |
| 4,223,912 | 9/1980 | Reyes | 280/267 |
| 4,605,086 | 8/1986 | Marom | 180/202 |
| 4,838,503 | 6/1989 | Konishi | 190/41 |
| 4,969,662 | 11/1990 | Stuart | 280/207 |
| 5,060,959 | 10/1991 | Davis et al. | 280/6.1 |
| 5,102,161 | 4/1992 | Williams | 280/207 |

Primary Examiner—Margaret A. Focarino
Assistant Examiner—Christopher P. Ellis
Attorney, Agent, or Firm—Richard C. Litman

[57] ABSTRACT

A vehicle body or chassis is raised and lowered on an associated suspension coil spring by a device including a screw, a motor and motor controller, and a gear drive. The device enables adjustment of body or chassis height by the vehicle operator while the vehicle is in motion. Locknuts determine a limited range of adjustment. A particularly advantageous application is adjustment of race cars for specific conditions pertaining to a particular race track or race event. In a preferred embodiment, major components of the device are readily removable from the vehicle, enabling the vehicle to be adjusted prior to a race, then modified to meet, illustratively, NASCAR rules operative during the race.

12 Claims, 1 Drawing Sheet

AUTOMATIC WEDGE CHASSIS ADJUSTER

FIELD OF THE INVENTION

The present invention relates to an apparatus for adjusting height of a motor vehicle body or chassis with respect to a vehicle suspension spring.

2. DESCRIPTION OF THE PRIOR ART

A motorized screw arrangement for adjusting height of a motor vehicle body or chassis (hereinafter referred to collectively as chassis) with respect to suspension springs is seen in U.S. Pat. No. 4,223,912, issued to Daniel Reyes on Sep. 23, 1980. A driving member turning the screw is located low on the screw, unlike the present invention wherein the driving member is located high on the screw, above the chassis member on which the screw bears. Also, the motor and drive units are not readily removable from the Reyes invention.

In U.S. Pat. No. 4,605,086, issued to Itshak Marom on Aug. 12, 1986, discloses a motorized system for lowering an auxiliary wheel of a vehicle down into engagement with a road surface.

A system for exerting force opposing upward force imposed upon a coil suspension spring in response to road surface fluctuations is seen in U.S. Pat. No. 4,969,662, issued to Keith O. Stuart on Nov. 13, 1990. This system does not establish a fixed dimension between the body or chassis and the top of the coil spring, thus determining the pitch of the chassis on the suspension.

U.S. Pat. No. 5,060,959, issued to Roy I. Davis et al. on Oct. 29, 1991, discloses a vehicle suspension unit including a height adjustment screw and motor, among other components. This device either supplements or replaces a coil suspension spring, but, in the manner of the Stuart device, does not establish a fixed dimension between chassis and coil spring.

U.S. Pat. No. 5,102,161, issued to Daniel E. Williams on Apr. 7, 1992, is representative of active or semi-active suspensions, which generally vary hydraulic fluid supplied to a suspension linear actuator.

None of the above inventions and patents, taken either a singly or in combination, is seen to describe the instant invention as claimed.

SUMMARY OF THE INVENTION

Automobiles driven under racing conditions, wherein the automobile may be modified from its original condition, and may have different varieties of tires selected to suit conditions existing under specific circumstances, must frequently have adjustment made to the relationship of chassis height above a suspension spring. The purpose of this adjustment is to redistribute weight favorably for a particular race. Current practice is to make this adjustment in practice prior to an official race. However, the task is complicated by apparatus which has traditionally been employed to adjust and fix the position of the chassis. This apparatus includes a screw mounted atop a coil suspension spring and extending into the vehicle. The screw is manually turned to achieve a desired setting. The effect of a particular setting can only be gauged by driving the vehicle at those speeds encountered under racing conditions, and the settings can only be changed when the vehicle is brought into the pit area for service.

Thus, a single setting is made in the pit area, and evaluated when the vehicle subsequently returns to the track and is again driven at race speeds. The requirement of making satisfactory adjustment is therefore time consuming, and may also require driving a specially prepared vehicle more than is desirable, considering near and stress imposed upon a vehicle at speed.

The present invention solves this problem by providing remotely controlled, motorized apparatus for turning the adjustment screw. Necessary adjustment can be made while the car is in motion, necessitating only a single high speed drive.

Recent suspension developments include so-called active suspensions, which automatically adjusts chassis height. However, under the sanctioning body of the National Association for Stock Car Auto Racing (NASCAR), such chassis adjustment systems are not permitted aboard the vehicle when racing. This objection requires disabling active suspensions, and further requires removal of motorized components which could otherwise be employed to effect chassis adjustment.

The present invention provides a highly practical apparatus for making such chassis adjustment, and is easily removable after a desired adjustment is secured, so that the vehicle meets NASCAR requirements.

An electric motor powered from the vehicle electrical system powers a geared drive which turns the screw in the manner of Reyes '912. However, the present invention cooperates with an existing adjustment screw apparatus, and also is easily removable to render the vehicle legal for NASCAR purposes.

The drive engages the screw at a point near the top of the screw, so that motor and drive are isolated from deleterious road conditions. Such conditions can include water, dust, and small stones and vehicle parts picked up and thrown by other vehicles.

Switches are provided at a location accessible to the driver which enable the motor to run in either direction, or not to run. A geared drive is biased to swing into engagement with the adjustment screw and is readily disengageable therewith.

Total available range of adjustment is limited by lock nuts threaded onto the screw.

Accordingly, it is a principal object of the invention to provide a motorized chassis height adjustment apparatus which selectively enables a driver to raise, lower, and maintain a chassis height with respect to a coil suspension spring.

It is another object of the invention to provide a chassis height adjustment apparatus which can be operated by a vehicle operator while the vehicle is in motion.

An additional object of the invention is to provide a chassis height adjustment apparatus which is usable with a conventional screw type chassis height adjuster.

It is a further object of the invention to provide a chassis height adjustment apparatus having a motorized portion which is readily removable from a vehicle.

Yet a further object of the invention is to provide a chassis height adjustment apparatus which is isolated from road conditions.

A still further object of the invention is to provide a chassis height adjustment apparatus which limits adjustment range within adjustable limits.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

The Drawing FIGURE is a perspective, partially broken away view of the invention and associated vehicle components.

Similar reference characters denote corresponding features consistently throughout the attached drawings.

DETAILED DESCRIPTION OF THE PREFERRED EMBODIMENT

Figure 1:
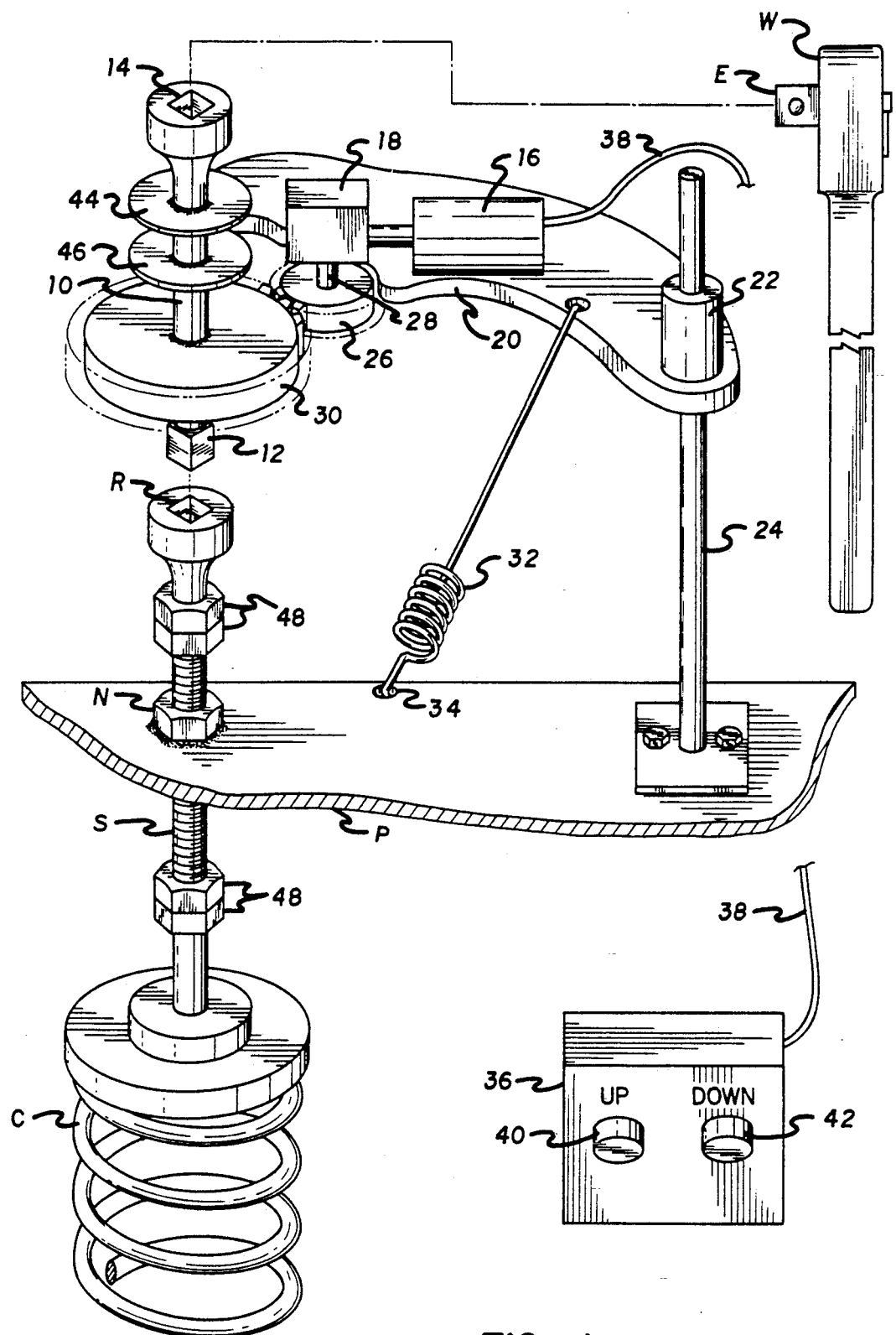

The present invention is seen in the Drawing Figure to cooperate with a screw S employed to adjust the height of a racing vehicle chassis (not shown) on a coil suspension spring C. In automobile racing, screw S has traditionally been adjusted by a manual wrench W. A square drive end E of wrench W engages a square drive socket or receptacle R of screw S, and screw S is turned clockwise or counterclockwise, as desired. Screw S is secured to coil spring C, and moves vertically with respect to a threaded nut N secured to vehicle floor pan P. The rest of the vehicle chassis moves as the floor pan P rises or lowers with respect to screw S.

In the arrangement of the present invention, a driveshaft 10 is provided to engage and drive screw S. When driveshaft 10 is rotated, screw S will also turn, thus accomplishing adjustment. Driveshaft 10, which, is formed with square drive end 12 and square drive socket 14, is driven by a motor 16 through a right angled gearbox 18.

Driveshaft 10 may still be operated manually by wrench W, as might be necessitated by failure of motor 16 or of some other component in the novel arrangement.

Motor 16 and gearbox 18 are supported on a pivotally mounted supporting bracket 20. Bracket 20 includes a pillow block bearing 22 which, in turn, rides on a stanchion 24 bolted to floor pan P.

A first gear 26 secured to gearbox output shaft 28 engages a second gear 30 which is fixed to driveshaft 10. First and second gears 26,30 are held in contact by biasing bracket 20 against driveshaft 10. Biasing is accomplished by providing a suitable spring 32, which is anchored to floor pan P, as by hook engagement of a hole 34.

Motor 16 is controlled by a pushbutton controller 36, which is preferably located within easy reach of a driver (not shown). A flexible wiring harness 38 connects motor 16 to controller 36, and also connects to the vehicle electrical system (not shown) at a convenient point to obtain power. Preferably, controller 36 has momentary contact pushbuttons 40,42. One pushbutton 40 energizes motor 16 to run in a direction elevating the vehicle chassis, and the other pushbutton 42 energizes motor 16 to lower the chassis. When neither pushbutton 40 or 42 is depressed, motor 16 does not run, and the chassis remains at a constant position with respect to suspension spring C.

When screw S turns, it either raises or lowers. Since gears 26 and 30 must remain in engagement, bracket 20 must raise or lower in tandem with screw S. A tracking system enabling such tandem motion is provided by forming a guide having upper and lower guide members 44,46, which partially surround bracket 20. When urged upwardly and downwardly by guide members 44 and 46, bracket 20 appropriately raises and lowers on stanchion 24, is enabled by pillow block bearing 22. Since wiring harness 38 is flexible, it is made with sufficient length to accommodate maximum travel of bracket 20, and no special provision need be made to enable wiring harness 38 to accommodate vertical displacement of bracket 20.

Biased engagement of gears 26 and 30, and pillow block bearing 22 provide a further function. Since remotely operated chassis adjustment apparatus is not permitted under current NASCAR rules, it is desirable to use the novel arrangement to make final chassis adjustments in practice laps, but remove the motorized portion for the actual race. Spring 32 is readily manually disengaged from its associated hole, and bracket 20 with associated motor 16 and gearbox 18 is readily removed from engagement with stanchion 24. Stanchion 24 by slidable disengagement from the stanchion 24 is left in place after removal of bracket 20 and associated components. This practice conforms to applicable rules since without motor 16, gearbox 18, and gear 26, objectionable remote adjustment cannot be performed.

To the extent required, wiring harness 38 can be dismantled by providing well known pull-apart electrical connectors (not shown) at appropriate points. Controller 36 can be mounted, as on the vehicle dashboard (not shown), by friction fasteners, hook and loop material, or other suitable readily detached fasteners (none shown).

Total available range of adjustment is limited by the following arrangement. Locking nuts 48 are placed on screw S as required, and turned against one another so as to lock in place. Vertical displacement of screw S is thus limited. This range of adjustment can itself be adjusted by relocating and retightening nuts 48 as desired.

A vehicle prepared for racing is preferably provided with one remote chassis adjustment apparatus for each corner thereof which a driver may wish to adjust.

The race vehicle is thus quickly and efficiently adjusted for favorable chassis height and weight distribution, and readily rendered legal for a race. The novel adjustment system is also readily restored to operable condition by reinstalling the removed components. It is to be understood that the present invention is not limited to the sole embodiment described above, but encompasses any and all embodiments within the scope of the following claims.

We claim:

1. In an automotive suspension including a screw permanently and adjustably mounted between a vehicle body or chassis and a coil suspension spring thereof, the screw adjusting height of the body or chassis on the suspension spring, the improvement comprising:

motor means comprising an electric motor having an output shaft, motor control means comprising switches and electrical conductors enabling said motor means to be selectively energized in a first direction, energized in a second direction, and stopped, drive means connecting said output shaft to the screw, whereby the screw is selectively rotated in a first and a second desired direction and maintained in a non-rotating condition when a vehicle operates said switches, and the height of the vehicle chassis or body is adjusted while the vehicle is being driven by the operator, said drive means also including means enabling ready engagement with and disengagement from the screw, and support means for holding said drive means and said motor means securely as a unit to the vehicle and in operable relationship to the screw, said support means being spring biased to normally retain the drive means and the motor means in operable relationship to the screw during normal operation of the vehicle, said support means being readily removed from a vehicle prior to a road race to prevent alteration of the vehicle suspension during the race.

2. The improvement according to claim 1, said means enabling ready engagement with and disengagement from the screw further including drive support mean for pivotally supporting said drive means, whereby said drive means is pivoted into and out of engagement with the screw.

3. The improvement according to claim 2, said means enabling ready engagement with and disengagement from the screw further including means biasing said drive means into engagement with the screw.

4. The improvement according to claim 1, further including means readily releasing said motor means from said support means, whereby said motor means is readily removed from the vehicle, leaving the screw in an operable condition.

5. The improvement according to claim 1, further including means readily releasing said drive means from said support means, whereby said drive means is readily removed from the vehicle, leaving the screw in an operable condition.

6. The improvement according to claim 5, further including means readily releasing said motor means from said support means, whereby said motor means is readily removed from the vehicle, leaving the screw in an operable condition.

7. The improvement according to claim 1, said drive means and said motor means being located on the vehicle at a level substantially at and above the screw upper portion, whereby said drive means and said motor means are isolated from road conditions.

8. The improvement according to claim 1, further including tracking means, whereby said drive means is maintained in operative position with respect to the screw when the screw is turned.

9. The improvement according to claim 1, further including limit means disposed about the screw and secured against axial displacement with respect to the screw, whereby screw adjusting height is limited to a range along the screw.

10. In an automotive suspension including a screw permanently and adjustably mounted between the vehicle body or chassis and a coil suspension spring thereof, the screw adjusting height of the body or chassis on the suspension spring, a removable, motorized drive apparatus comprising:

motor means having an output shaft, motor control means comprising switches and electrical conductors enabling said motor means to be energized selectively in a first direction, energized in a second direction, and stopped, and drive means for imparting rotation from said motor output shaft to said shaft means, said drive means including shaft means having at least one end configured to engage the screw and impart rotation thereto, a circular member bearing against said shaft means, and imparting rotation thereto, whereby the screw is selectively rotated in a first and a second desired direction and maintained in a non-rotating condition when a vehicle operator operates said switches, and the height of the vehicle chassis or body is adjusted while the vehicle is being driven by the operator, said drive means also including means enabling ready engagement with and disengagement from the screw, comprising bracket means pivotally and axially slidably supported on a vertical rod, said bracket means supporting said circular member, said bracket means being slidably disengageable from said vertical rod, whereby said bracket means and therefore said circular member are manually disengageable from said removable, motorized drive apparatus.

11. The removable, motorized drive apparatus according to claim 10, said bracket means also including spring means for biasing said bracket means against said shaft means, whereby said bracket means, and therefore said circular member, are urged into operative, driving contact with said shaft means.

12. The removable, motorized drive apparatus according to claim 11, further including limit means disposed about the screw and secured against axial displacement with respect to the screw, whereby screw adjusting height is limited to a range along the screw.

* * * * *